United States Patent [19]

McGinnis

[11] 3,917,092

[45] Nov. 4, 1975

[54] CONVEYOR BELT WITH SPROCKET DRIVE

[75] Inventor: Hebert E. McGinnis, Akron, Ohio

[73] Assignee: The B. F. Goodrich Company, Akron, Ohio

[22] Filed: Aug. 16, 1971

[21] Appl. No.: 172,108

[52] U.S. Cl. .............................. 214/83.36; 198/193
[51] Int. Cl.² ...................... B60P 1/00; B65G 15/30
[58] Field of Search ........... 198/203, 193; 214/83.3, 214/83.34, 83.36

[56] References Cited
UNITED STATES PATENTS

| 697,874 | 4/1902 | Oldham | 198/203 |
| 2,698,104 | 12/1954 | Dudley | 214/83.36 |
| 3,072,037 | 1/1963 | Hixon | 198/193 |
| 3,185,324 | 5/1965 | Breithaupt et al. | 214/83.36 |
| 3,481,807 | 12/1969 | Kanamori | 198/193 |
| 3,498,684 | 3/1970 | Hallaman | 198/193 |

FOREIGN PATENTS OR APPLICATIONS

| 777,252 | 6/1957 | United Kingdom | 198/193 |

Primary Examiner—Evon C. Blunk
Assistant Examiner—Joseph E. Valenza
Attorney, Agent, or Firm—W. A. Shira, Jr.

[57] ABSTRACT

A conveyor belt driven by a pair of coaxial sprockets has sprocket holes in its edges adjacent to essentially inextensible longitudinal cables embedded in elastomer. Transverse reinforcements embedded in the elastomer connect the cables, and a low-friction fabric covers the bottom surface. The belt is used for moving heavy loads over a short distance, as in discharge of coal from a mine shuttle car in which the belt is supported on a smooth flat bed and driven by a pair of sprockets.

12 Claims, 7 Drawing Figures

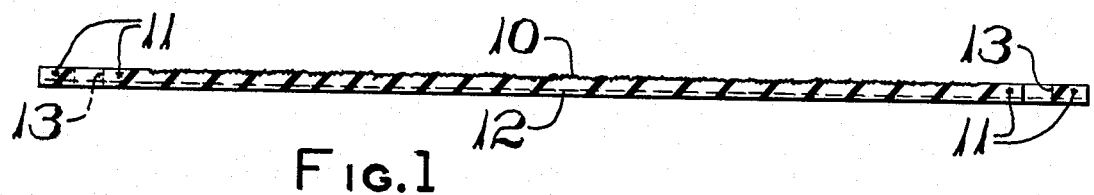
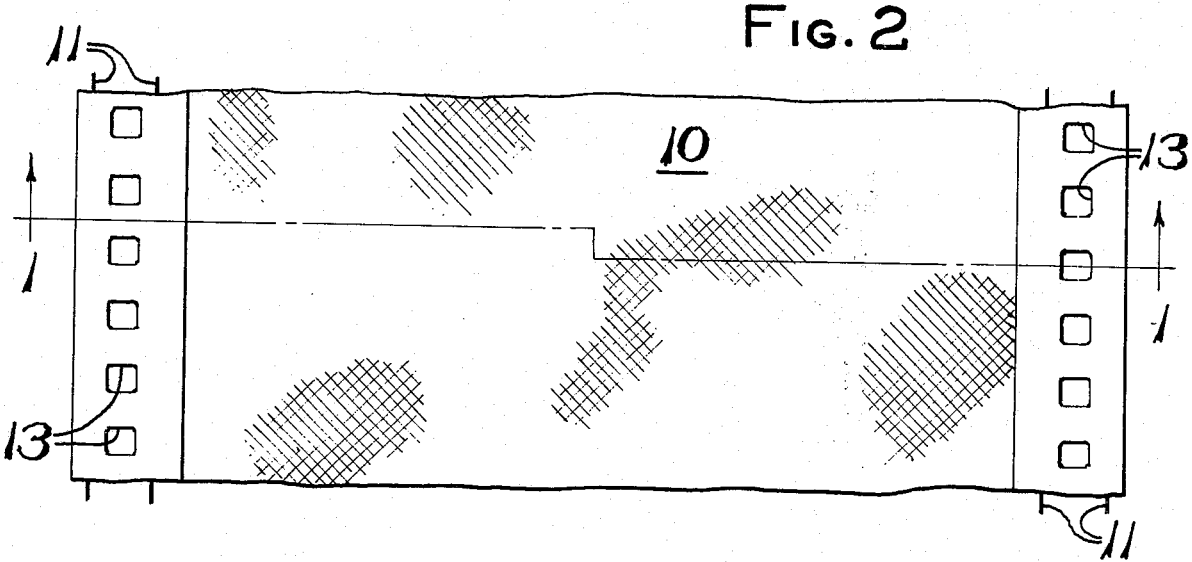
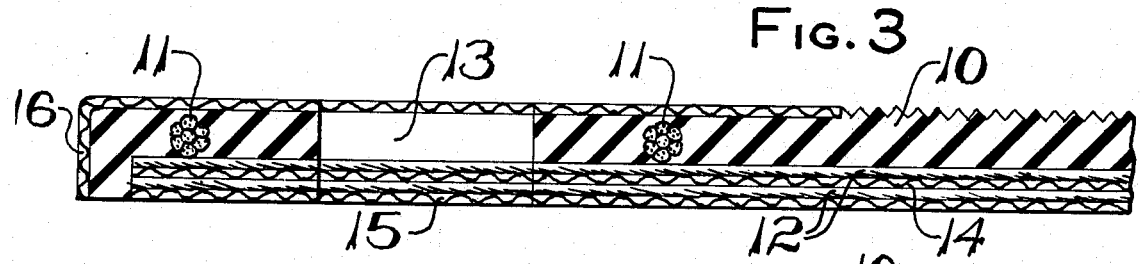
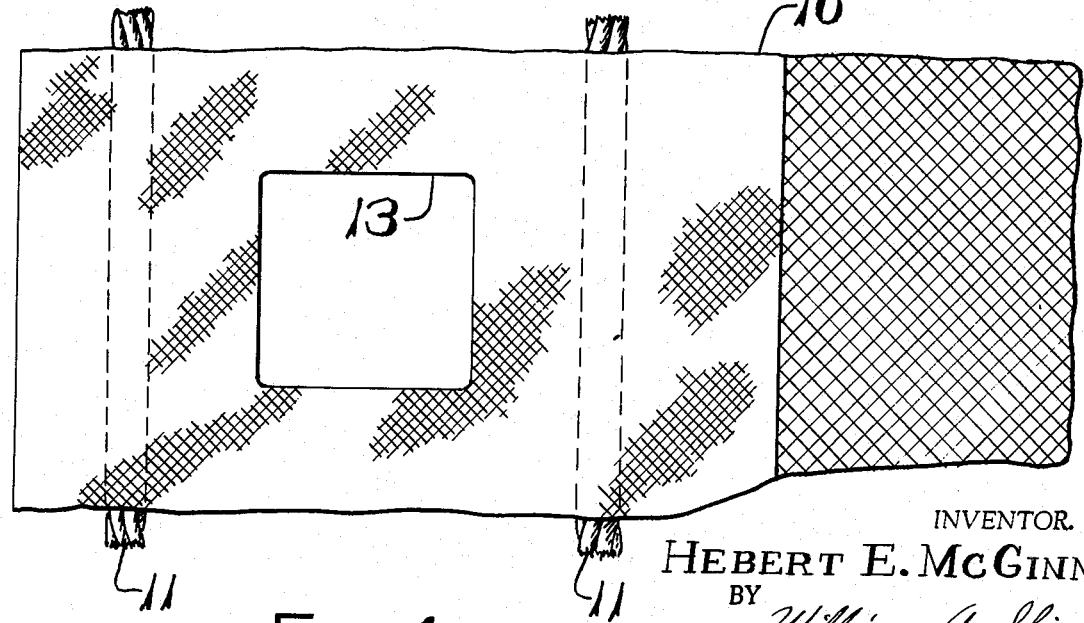

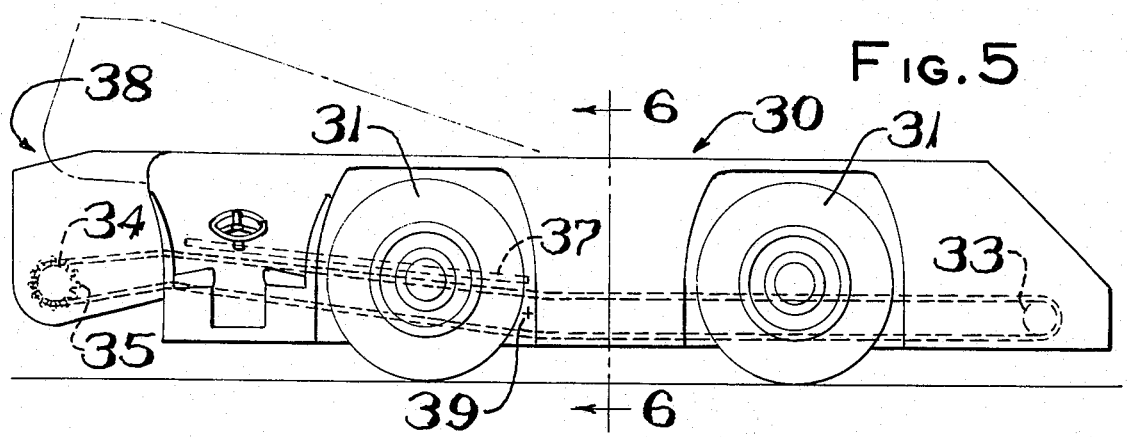
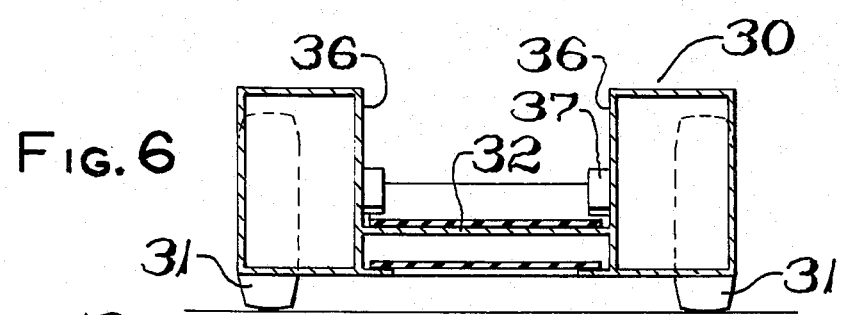
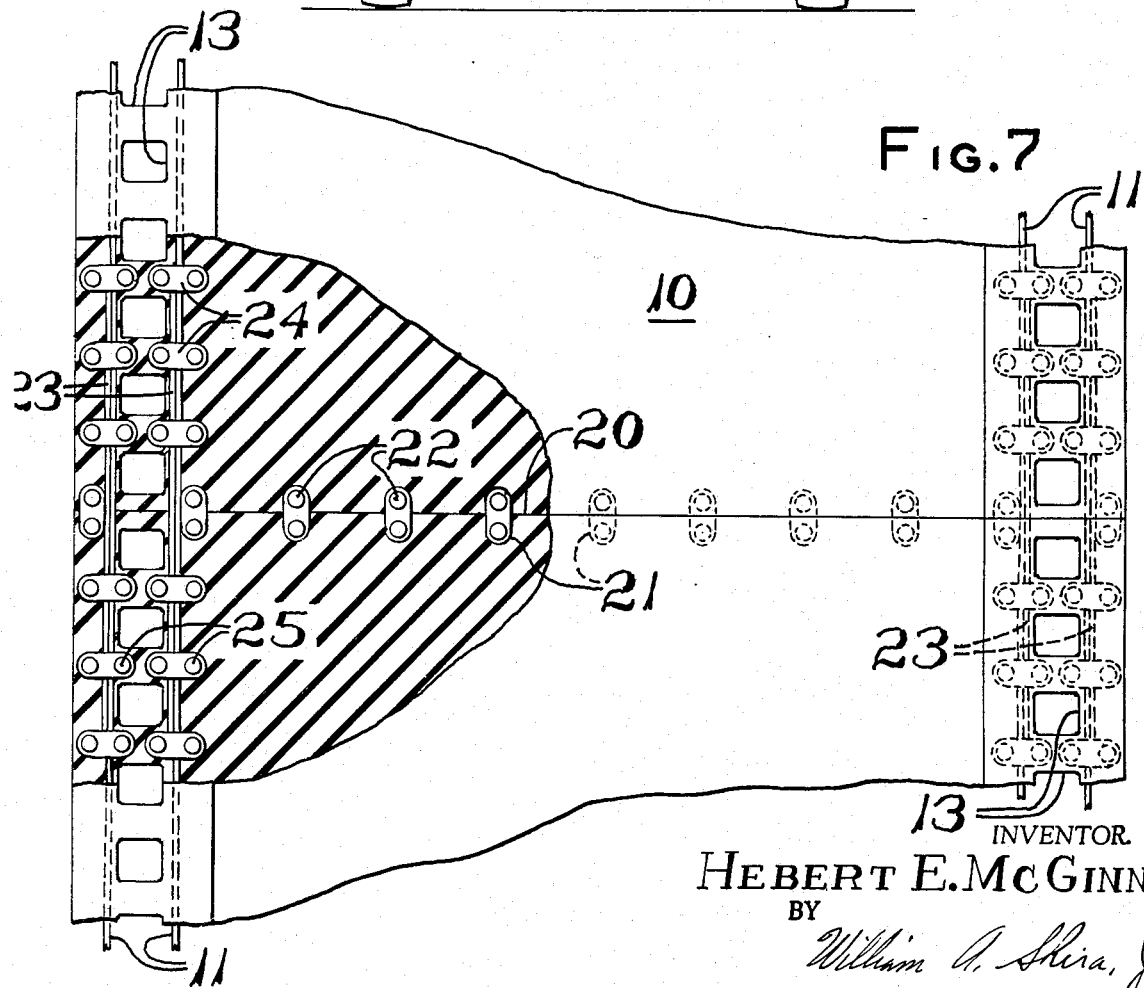

CONVEYOR BELT WITH SPROCKET DRIVE

BACKGROUND OF THE INVENTION

In the many situations in which it is not convenient to unload a vehicle by gravity, because of absence of the necessary headroom for the inclined surface required, or because of the sticky, fragile, or otherwise unsuitable character of the load of material, there has been no generally suitable power unloading mechanism. Conventional conveyors have not solved the problem because the total load on a vehicle bed exceeds in depth and in weight per unit area, by many times, the values at which previously known conveyors can be made to operate satisfactorily and economically.

Thus, belt conveyors have been found to be generally incapable of receiving and transmitting the necessary driving forces without slippage, except under ideal circumstances with specialized kinds of load, and flight conveyors have required such massive constructions and high powered drives as to be excessively expensive in both first cost and operating cost.

SUMMARY OF THE INVENTION

I have discovered that a belt of a very special construction can be employed to cover the bed of a self-unloading vehicle and for other analogous purposes, and will exhibit at the same time a low coefficient of friction, permitting it to be moved easily over a flat bed support, and an ability to receive a positive drive impulse and transmit it to the load.

This construction involves placement of essentially inextensible longitudinal reinforcements in the edges of the belt adjacent to sprocket holes, preferably in the form of a pair of cables in each edge so that one cable of the pair will be on each side of the row of sprocket holes. It also involves placement of transverse reinforcements crosswise of the belt so as to strengthen the periphery of the sprocket holes and to transmit the driving force across the width and along the length of the belt between the longitudinal cables so as to overcome the friction between the belt and its flat bed support. Finally, it involves a bottom surface of low-friction material to minimize the force required to move the belt and the power needed for carrying out the unloading operation by a drive mechanism including a pair or pairs of driven sprockets.

THE DRAWINGS

In the accompanying drawings, FIG. 1 is a transverse cross-section of an embodiment of the belt of this invention, and FIG. 2 is a top view of a short length of the same belt.

FIG. 3 is a cross-section on an enlarged scale, of an edge of the belt, and FIG. 4 is a top view of a corresponding portion of an edge.

FIG. 5 is a small-scale side view of a transfer vehicle equipped with the belt of this invention, and FIG. 6 is a transverse section of the same, partly broken away to show the location of the belt on a supporting bed.

FIG. 7 is a view, partly cut away, of a splice in the belt.

DETAILED DESCRIPTION

As shown in FIGS. 1 and 2, the belt consists of a body 10 of suitable elastomer, and reinforcements embedded in the elastomer. The elastomer may be any material which is sufficiently resilient and durable, such as natural or synthetic vulcanized rubber or a flexible thermoplastic.

Close to each edge of the belt is a spaced pair of stout, flexible cables 11 functioning as longitudinal reinforcements for the belt. The cables are of flexible but essentially inextensible material, preferably of strands of steel sufficiently fine to flex easily around the end drums, and treated for adhesive bonding to the body 10 of elastomer.

Extending across the entire width of the belt are transverse reinforcements, preferably one or more plies of essentially inextensible cords 12, also bonded to the body 10 of elastomer. These may be arranged either as a single or multiple layer of straight-cut or bias-cut woven fabric, or as a pair or pairs of bias-cut weftless cords, or as one or more layers of straight-cut essentially weftless cords laid perpendicular to the length of the belt.

Adjacent to the cables, and preferably between the cables 11 of each pair, is a row of sprocket holes 13 near each edge of the belt, which may be cut through all layers of material in the belt after it is molded.

A more detailed showing of the construction in FIGS. 3 and 4 shows the multiple strand cables 11 embedded in the body 10 of elastomer near its top surface, on either side of the sprocket holes 13.

Underneath the cables 11 but closely adjacent to them, is a layer of transverse reinforcement, in this instance an upper ply of steel cords 12 embedded in the body 10 and extending from one side to the other of the belt perpendicular to the length of the belt. In contact with the upper ply of steel cords and spacing it from a lower ply of similar cords 12, is a woven fabric 14, which may be, but does not need to be, the same as the cover fabric which will be described below. The presence of two spaced plies of steel cords 12 imparts a desirable transverse beam stiffness to the belt, to prevent wrinkling which might otherwise occur under the severe transverse shear stresses to which such a belt is subjected in its intended service.

The bottom surface of the belt is composed of a material of low coefficient of friction, which, in this case, is a woven fabric 15 of nylon continuous filament yarns, bonded to the elastomer but not impregnated with it. Because of the slick nature of the nylon material, which has an inherently low coefficient of friction against smooth surfaces, in the range of 0.15 to 0.25, this fabric bottom surface permits the belt to slide over a sheet steel bed without need for any kind of lubrication, with a driving force of reasonable magnitude.

Preferably, the same kind of cover fabric extends around the vertical edge surface and across the marginal portion of the top, since these areas are likely to rub against edge guides or against skirts, as will be described below. If desired, a single piece of nylon fabric can extend across the entire bottom, around the edges, and across the marginal portion of the top. As shown in FIG. 3, it may be simpler to apply a separate narrow strip 16 of the same nylon fabric to the vertical edge and the marginal portion of the top.

The spaces on either side and between the cables 11 are filled with elastomer and a substantial thickness of elastomer is applied over the transverse cords 12 to provide an even surface for the body 10 of the belt and to protect the belt against abrasive wear. The assembly is molded under pressure in a belt press to consolidate the structure and bond all of the elements of the belt firmly together. Preferably, the top of the elastomer where it is exposed to the load is molded with a rough or non-planar surface to prevent undue slippage of the load during use of the belt.

As already mentioned, the sprocket holes are cut through the elastomer, top and bottom cover, and transverse reinforcements. Experience has shown that if the elements of the structure are properly bonded together, no finish or lining is needed in the sprocket holes, as properly designed smooth sprocket teeth will engage the raw cut edges of the holes satisfactorily and transmit the driving forces through the remaining portions of the transverse cords 12 to the longitudinal cables 11, and from them to the entire width and length of the belt.

Since belts of this kind are used in an endless condition, it is necessary to provide for a splice of the end portions of a length of belt to make it endless. For this purpose, the ends are cut off square, midway between sprocket holes, as shown in FIG. 7, and are brought together, preferably with an intervening layer of cement or of vulcanizable elastomer 20. Mechanical fasteners such as the clamping plates 21 and bolts 22 may then be applied to hold the edges together. If plates and bolts are used, space for them is provided by trimming away the elastomer material of the body 10 on top and the nylon fabric 15 on the bottom to expose the transverse cords 12. The longitudinal cables 11 are joined by removing the edge strip 16, or at least the portion of it over the cables 11, and cutting grooves in the body 10 of elastomer immediately adjacent to the ends of each cable.

Short lengths 23 of cable identical to cables 11 are laid against the latter in the grooves and new elastomer material is filled in to replace all the elastomer which was removed. If desired, the overlapping cable ends can be joined by additional clamps 24 and bolts 25, which bear against the top of the cables and the bottom of the transverse cords to hold them all firmly together. However, if the overlapping of the cable ends is reasonably long, the tension forces can be transmitted adequately by shear stress in the elastomer, and mechanical fastenings such as clamped plates can be omitted.

Finally, all portions of the fabrics 15 and 16 which were removed are replaced. The splice is then finished by molding the replaced material to join all parts and produce a surface continuous with that of the remainder of the belt.

The belts of this invention can be used in any situation where great loads are required to be moved very short distances so that the total tension required to move the belt is not excessive. They are particularly useful for covering the beds of mine shuttle cars, which are used for transporting coal, ore, and the like from the working face of a thin seam underground mine to a collecting point where the mined coal or ore can be processed or be transferred to a more or less permanently installed conveyor.

Thus, in coal mining with mining machines cutting out coal from the edge of an underground coal seam from three to six feet thick, the mining machine deposits the coal in self-powered shuttle cars, one of which is illustrated diagrammatically in FIGS. 5 and 6. The shuttle car 30 moves on rubber tired wheels 31 driven by a suitable motor. Such cars have previously been provided with flight conveyors for unloading at the transfer point, but the flight conveyors are expensive, troublesome to maintain, and have short lives. According to this invention, the flight conveyors are replaced by belts of the kind described above.

Each shuttle car 30 has a flat bed 32 of smooth steel plate on which rests the upper load-carrying run of the belt body 10. The belt passes over rotatable end drums 33 and 34, one or both of which may be power driven. In addition, sprocket wheels 35 are mounted on the power driven axle of at least one end drum 34, with sprocket teeth engaging the holes 13 in the edges of the belt. The shuttle car 30 also has sides 36 to contain the load against lateral spillage. Attached to the sides just above the edges of the belt, may be horizontal guide flanges 37 to prevent the edges of the belt from lifting when placed under high tension. In addition, the shuttle car may have its discharge end 38 pivoted on an axis 39 so that it can be lifted by a power driven mechanism, on arrival at a transfer point, to the position shown in dot-dash lines in FIG. 5, to permit discharge of the load into a suitable hopper.

The shuttle cars, equipped with the special kind of belt conveyor described above, are driven to the rear of the mining machine and receive a load of freshly mined coal, which may amount to ten tons, on a bed having an area of about 4 by 20 feet. The cars are then driven to the transfer point, which may be some hundreds of feet distant, and the discharge end 38 is lifted over the loading hopper of a continuous conveyor which carries the coal to the surface of the ground. Upon putting the sprockets in motion, the entire load is shifted and progressively dumped over the end of the car, with a far lower consumption of power than the previously used flight conveyors, and with less grinding action than that associated with drag chain conveyors.

I claim:

1. A belt for carrying heavy loads for short distances by sliding on a flat bed, comprising a body of elastomer having a bottom surfaced with a material having a coefficient of friction against metal not over about one-fourth and a thick top of wear-resisting elastomer material, a pair of essentially inextensible steel cable longitudinal reinforcements in each edge portion of the belt, transverse reinforcements connecting the longitudinal reinforcements, and a row of sprocket holes between the cables in each pair.

2. A belt as in claim 1, in which the transverse reinforcements are an array of steel cords.

3. A belt as in claim 2, in which the steel cords are essentially perpendicular to the length of the belt.

4. A belt as in claim 3, in which the bottom surface of the belt is a nylon fabric.

5. A belt as in claim 4, in which the belt is endless.

6. A belt as in claim 5, in which the belt has a splice and in which the ends of the cables overlap and the overlapped portions are each bonded to the elastomer.

7. A belt as in claim 6, in which the overlapped portions comprise short lengths of cables spanning a joint in the cables.

8. The combination of an endless belt for carrying heavy loads for short distances by sliding on a flat bed, comprising a body of elastomer having a bottom surfaced with a material having a coefficient of friction against metal not over about one-fourth and a thick top of wear-resisting elastomer material, essentially inextensible longitudinal reinforcements in the edges, transverse reinforcements connecting the longitudinal reinforcements, and a row of sprocket holes adjacent the longitudinal reinforcements in each edge, with a smooth flat bed supporting surface; a pair of rotatable drums at the ends of the supporting surface for guiding the belt over the supporting surface, and at least one pair of sprockets engaging the sprocket holes for driving the belt.

9. The combination with a belt as in claim 5, of a smooth flat bed supporting surface, a pair of rotatable drums at the ends of the supporting surface for guiding the belt over the supporting surface, and at least one pair of sprockets for engaging the sprocket holes for driving the belt.

10. The combination as defined in claim 9, in which the sprockets are coaxial with one of the drums.

11. The combination as defined in claim 10, mounted on a vehicle.

12. The combination as defined in claim 11, in which the vehicle is self-powered for transportation of the load on the belt from one place to another, and the sprockets are power driven for unloading the vehicle at its destination.

* * * * *